DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JANUARY 27, 1970

870 O.G. 1063

T870,020

PROCESS FOR PRODUCING POLY (ESTER-AMIDES)

William H. Seaton and Thomas E. Buckner, both of P.O. Box 511, Kingsport, Tenn. 37662

Filed Sept. 27, 1968, Ser. No. 763,400

**Int. Cl. C08g *20/30***

U.S. Cl. 260—75

No Drawing. 12 Pages Specification

Fiber-forming poly(ester-amides) are prepared by reacting in an inert atmosphere (A) a fluidized polyester such as poly(ethylene terephthalate) and (B) a bifunctional reactant in vapor form selected from the group consisting of diamines and amino alcohols, said condensation being effected at a temperature below the melting point of said fluidized polyester.